United States Patent
Jakobsson

(10) Patent No.: US 6,377,943 B1
(45) Date of Patent: Apr. 23, 2002

(54) INITIAL ORDERING OF TABLES FOR DATABASE QUERIES

(75) Inventor: Håkan Jakobsson, San Francisco, CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/233,019

(22) Filed: Jan. 20, 1999

(51) Int. Cl.⁷ .............................................. G06F 17/30
(52) U.S. Cl. .................... 707/2; 707/3; 707/4
(58) Field of Search .............. 707/2, 3, 4, 1, 707/5

(56) References Cited

U.S. PATENT DOCUMENTS

| | | | |
|---|---|---|---|
| 5,345,585 A | * 9/1994 | Iyer et al. | 395/600 |
| 5,379,419 A | * 1/1995 | Heffernan et al. | 395/600 |
| 5,671,403 A | * 9/1997 | Shekita et al. | 395/603 |
| 6,138,111 A | * 10/2000 | Krishna | 707/2 |

OTHER PUBLICATIONS

Swami, Optimization of Large Join Queries: Combining Heuristics and Combinatorial Techniques, ACM, 1989, pp. 367–376.*

Swami et al., Optimization of Large Join Quries, ACM, 1988, pp. 8–17.*

* cited by examiner

Primary Examiner—Hosain T. Alam
Assistant Examiner—Joon H. Hwang
(74) Attorney, Agent, or Firm—Ditthavong & Carlson, P.C.

(57) ABSTRACT

Multiple initial orderings of tables are used a multiple starting point in a cost-base, cut-off search for a good ordering of tables in processing a database query that specifies multiple join operations. Multiple heuristics may be used to generate the multiple initial orderings of the tables. The database query is executed with the good ordering of tables.

12 Claims, 5 Drawing Sheets

INITIAL ORDERING OF TABLES FOR DATABASE QUERIES

FIELD OF THE INVENTION

The present invention relates to computer database systems and more particularly to processing queries that specify a join operation.

BACKGROUND OF THE INVENTION

Relational databases store information in collections of tables, in which each table is organized into rows and columns. FIG. 5(a) illustrates an exemplary database 500 containing four tables, useful in a sales application. Order table 502 records information about orders, identified by an order identifier (OID), that are submitted by customers, identified by a customer identifier (CID). For example, the first row of order table 502 indicates that customer #2 submitted order #1. Customer table 504 records information about customers, identified by a CID, including the ZIP code in which the customer is located. For example, the first row of customer table 04 indicates that customer #2 is located in ZIP code 19555. Assignment table 506 lists which sales associates, identified by a sales associate identifier (SID), are responsible for which customers, identified by the CID. In the example, the first and second rows of assignment table 506 indicate that customer #2 is assigned to sales associates #1 and #2. Finally, sales associate table 508 records information about each sales associates, identified by the SID, including the name of the associates. For example, the first two rows of sales associate table 508 indicate that "Smith" is the name for sales associate #1 and "Jones" is the name for sales associate #2.

A database user retrieves information from the tables of a relational database by entering input that is converted to queries by a database application. The database application, in turn, submits the queries to a database server. In response to receiving a query, the database server accesses the tables specified in the query to determine which information within the tables satisfies the query. The information that satisfies the queries is then retrieved by the database server and transmitted to the database application and ultimately presented to the user. Database servers are also capable of "joining" information contained in many of the tables into a single result in response to a query. For example, one query for the exemplary database is to list all the orders of customers in ZIP code 19555 for sales associate Smith.

For any given database application, the queries must conform to the rules of a particular query language. Most query languages provide users with a variety of ways to specify information to be retrieved. For example, in the Structured Query Language (SQL), the following query requests the retrieval of all the orders of customers in ZIP code 19555 for sales associate Smith:

[QUERY 1]

select OID, NAME
from Order 0, Customer C, Assignment A, Sales_Associate S
where O.CID =C.CID and C.ZIP=19555 and
  C.CID=A.CID and A.SID=S.SID and
  S.NAME="Smith";

This query performs a "join" operation on the order table 602, customer table 604, assignment table 606, and sales associate table 608. A join operation combines rows from two or more relational database objects, such as tables, views, or snapshots, that meet a specified criterion, called the "join conditions." A join operation is performed whenever multiple tables appear in the FROM clause of query. In this example, four tables are listed. The SELECT list of the query can reference any of the columns from any of the base objects listed in the FROM clause. The join conditions are specified by the predicates in the WHERE clause. A join condition can relate to a single table, for example C.ZIP= 19555, or to multiple tables, for example, O.CID=C.CID. A result of the query is depicted in FIG. 5(b). Specifically, query result 510 includes a tuple of order #1 and Smith's name.

When the join operation is commutative and associative, as in this example, the tables may be joined in any order without affecting the final result. However, while not affecting the final result, the order in which the tables are joined or "join order" may have a significant effect on the performance of the database system. For example, joining the order table 502 with the customer table 504 first results in a single tuple, which helps to constrain the amount of input/output in later join operations, but joining customer table 504 with sales associate table 508 results in a Cartesian product of twelve tuples, larger than any of the tables and very expensive to process. Therefore, it is desirable to find a join order that has good performance, because an arbitrary join order, for example, the order listed in the FROM clause, may be prohibitively expensive to process. Techniques have been developed in an attempt to discover a good join order for a database query, but many of these techniques have proven to be inadequate.

For example, one technique, called a "heuristic approach," examines the join conditions and statistical information about the tables. Various rules of thumb or "heuristics" are applied to this information to select a good join order as the desired join order in executing the query. There is much controversy about which heuristic is superior to another, and it appears that the best heuristic may vary from query to query. Thus, a heuristic that is appropriate from some queries may produce a join order that is too expensive for other kinds of queries and miss a good join order.

Another technique is called an "exhaustive search" wherein every possible join order is evaluated for a performance cost and the best cost join order is selected. The possible join orders are produced from an initial join ordering by an enumeration function that permutes the order of the tables in a predetermined, and typically recursive, sequence. A common sequence is a depth-first search sequence, wherein the tail of the initial join ordering is permuted before the head of the initial join ordering is permuted. The performance cost is typically based on the estimated amount input/output that would occur if the query was executed according to each join order. A major difficulty with finding a good join order according to an exhaustive search is apparent when there are many tables to be joined, for example, more than eight. For n tables to be joined, there are n-factorial (n!) number of possible join orders to consider. For example, with nine tables there are 9!=362,880 possible join orders.

Consequently, pruning techniques have been applied to limit the number of join order permutations that are considered. For example, with a depth-first search enumeration function, if the cost of performing the first join operation in a given generated join order is more than the cost of the best join order generated so far, then all join orders with that join operation first in the join order can be safely disregarded. Typically, however, pruning techniques do not disregard a sufficient number of join order permutations to make an exhaustive search feasible, especially for queries with a very large number of joined tables. Consequently, it is not uncommon for database systems to spend ten times as much time determining a good join order for a query than executing the query.

A "cut-off search" is a refinement of an exhaustive search. Using a "cut-off" search, the best cost estimate for executing the query (the estimated cost of executing the query using the join order that is currently considered "best") is continually compared with a cost estimate for performing the search for the best join order. When the search cost exceeds the best cost estimate, then the search is terminated and the current best cost join order is chosen for processing the query. Consequently, the database system employing a cut-off search technique will rarely spent more time determining a good join order than executing the query.

The efficiency of a cut-off search is likely to be sensitive to the initial ordering that is the starting point of the search. The earlier a good plan is found, the earlier the cut-off can occur and the less time will be spent optimizing the query. Conversely, if all the permutations generated early have bad costs, the optimization phase will likely continue longer since there is no good plan available to trigger the cut off. Many enumeration algorithms are history sensitive in that the next join order permutation is determined based on the previous one and will likely generate a join order close to the initial permutation in the search space of different permutations before generating one that is far away. Hence, if the initial permutation is good or is close to a good one in the search space, it is likely that the optimization can be cut off early. On the other hand, a poor initial ordering can delay the cut off or lead to a good join order never being generated if all the good orderings are too far way in the search space to be reached before the search is cut off. Therefore, the initial ordering is crucial for good performance. However, even when the initial ordering is selected according a heuristic approach, such as in an approach described in U.S. Pat. No. 5,758,335, the initial ordering may be poor since there is no single heuristic that will always generate a good initial ordering.

SUMMARY OF THE INVENTION

Accordingly, there is a need for efficiently processing queries with multiple join operations. A need exists for a method of determining an efficient join order to process a query. There is also a need for ensuring that the enumeration of join orders is not limited to those in close locality to a poor initial ordering.

These and other needs are addressed by the present invention by generating multiple initial join orders and performing searches upon those multiple initial join orders. The locality effect is ameliorated by use of the multiple initial join orders, because the different initial join orders serve to spread out the search over the search space. In one embodiment, the multiple initial join orders are generated by multiple heuristics, thereby increasing the likelihood that good join orders are considered for a broad range of queries.

One aspect of the invention, therefore, is a computer-implemented method and computer-readable medium bearing instructions for processing a query specifying a plurality of join operations involving tables or other database objects. This methodology includes parsing the query to determine the join operations; determining a join order of the join operations by (1) generating a plurality of initial join orderings, (2) determining local best join orders based on the initial join orderings, and (3) selecting the best of the local best join orders; and executing the query based on the join order. In one embodiment, the initial join orderings are generated according to a plurality of heuristics.

Another aspect of the invention is a computer-implemented method and computer-readable medium bearing instructions for method of determining a desired ordering of join operations on database objects specified by a query to process said query, comprising the computer-implemented steps of: generating a first initial join ordering of the database objects; enumerating a plurality of first join orderings based on the first initial join ordering to search for the desired ordering based on cost estimation; generating a second initial join ordering of the database objects; and enumerating a plurality of second join orderings based on the second initial join ordering to search for the desired ordering based on cost estimation. By generating at least two initial join orderings, locality effects of enumerating join orderings can be ameliorated.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for determining a join order in processing a query is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In a database management system, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

Systems that implement the present invention are not limited to any particular type of data container or database architecture. However, for the purpose of explanation, the terminology and examples used herein shall be that typically associated with relational databases. Thus, the terms "table," "row," and "column" shall be used herein to refer respectively to the data container, record, and field.

HARDWARE OVERVIEW

Figure 1:
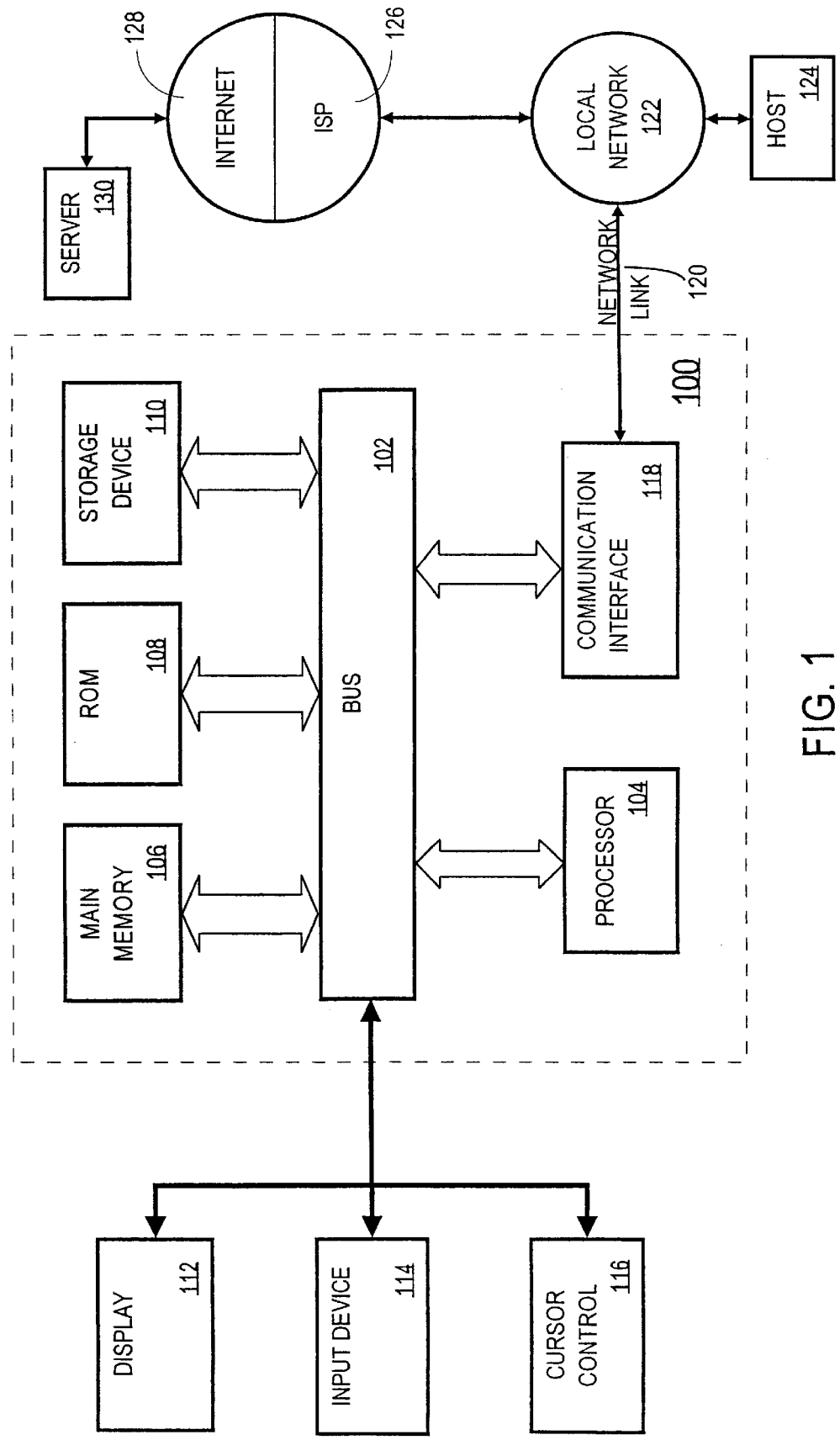
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for determining a join order in processing a query. According to one embodiment of the invention, determining a join order in processing a query is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 1 18 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for determining adjoin order in processing a query as described herein.

The received code may be executed by processor 104 as it is received, and/or stored in storage device 110, or other non-volatile storage for later execution. In this manner, computer system 100 may obtain application code in the form of a carrier wave.

MULTIPLE STARTING POINTS

One aspect of the present invention stems from the realization that locality effects due to a history-sensitive enumeration can be alleviated by providing multiple starting points for the enumeration. Use of multiple starting points for the enumeration ensures that various different parts of the search space are considered. Therefore, locally optimal solutions can be considered even though they are more distant from each other than the typical length of a cut-off search.

Figure 2:
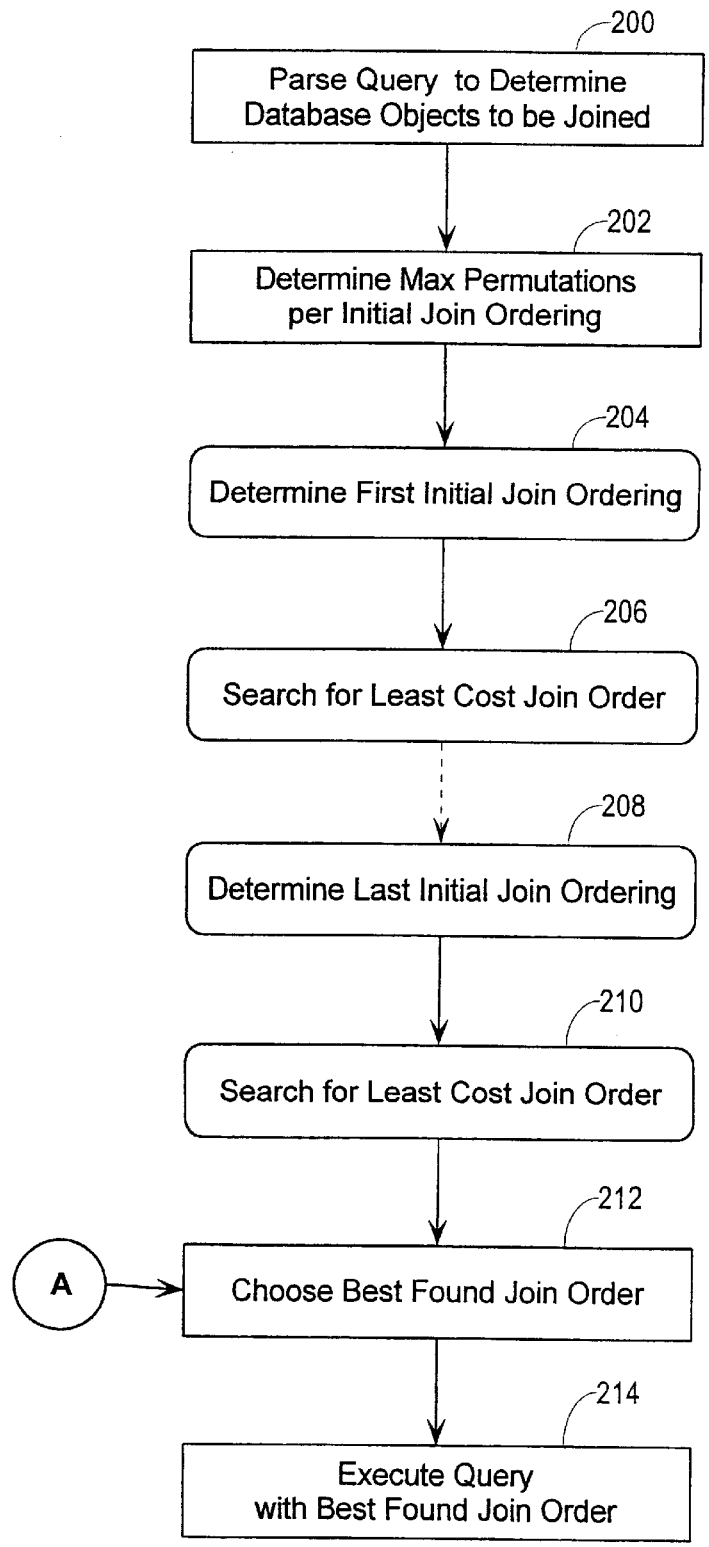
FIG. 2 is a flowchart illustrating the operation of determining a desired join order when processing queries having an multiple join operations according to one embodiment.

FIG. 2 is a flowchart illustrating an operation of processing a query that specifies a plurality of join operations on one or more database objects. At step 200, the query is parsed to determine, among other things, the tables and other database objects that must be joined to execute the query. At steps 202–212, a desired join order of the database objects is determined by generating a plurality of initial join orderings, and the query is executed with the desired join order in step 214.

In one embodiment, a maximum number of permutations per initial ordering is determined (step 202). Preferably, this maximum number is based on a user-specified parameter to grant the user some control over how much time is spent looking for a desired join order while processing a query for a database application. For example, if a query is to be repeatedly executed, then it may be desirable to spend more time looking for a desired join order because the desired join order can be cached and reused. On the other hand, if there are many different queries, each of which is only to be executed once, then it may be more desirable to limit the time looking for a desired join order to improve throughput. The user-specified parameter can indicate the maximum number of permutations to search per each initial join ordering or, preferably, the maximum total join ordering permutations to search (regardless of the number of initial join orderings). The latter implementation provides the user with more control if the number of multiple initial join orders is allowed to vary from query to query.

At step 204, the first initial join ordering is determined. One method of determining the first initial join ordering is described on FIG. 3 and hereinafter, although this aspect of the invention is not limited to any particular method of determining the initial join ordering and may vary from implementation to implementation. As step 206, a least cost join order is searched for, up to the maximum number of permutations determined in step 202. One method of searching for a least cost join order is describe in FIG. 4 and hereinafter, although this aspect of the invention is not limited to any particular method of searching for a least cost join order.

After the first initial join ordering was determined and searched, one or more other initial join orderings are also determined and searched. All but the last of these operations are elided from FIG. 2 by the dotted line connecting step 206 to step 208. Furthermore, although FIG. 2 illustrates one embodiment in which the multiple initial join orderings are generated and searched sequentially one after the other, another embodiment initially generates all the multiple join orderings first and then performs the searches in an interleaved fashion or even in parallel.

At step 208, the last of multiple join initial orderings is determined, and the least cost join order is searched for in step 210, up to the maximum number of permutations determined in step 202. At step 212, the best found join order is chosen as the desired join order for executing the query. If a cut-off search is used to find the local least cost join orders, then when the cut-off condition is met the search for local least cost join orders is terminated and control is directed to step 212, via connector A.

MULTIPLE HEURISTICS

Another aspect of the invention relates to the use of multiple heuristics to generate the multiple initial orderings. A heuristic is simply a "rule of thumb" that selects the most appropriate solution according to some criterion. The appropriateness of the solution is evaluated with regard to the general case, even though there may be exceptions to that general case. Heuristic rules are useful, despite the exceptions, because they are designed to be easier to apply than finding the exceptions. While there remains some controversy as to whether any single heuristic is clearly superior to others in terms of determining the globally optimal solution, the use of multiple heuristics, on the other hand, is likely to give rise to several good initial join orderings and, hence, increase the chance of finding the globally optimal solution.

Figure 3:
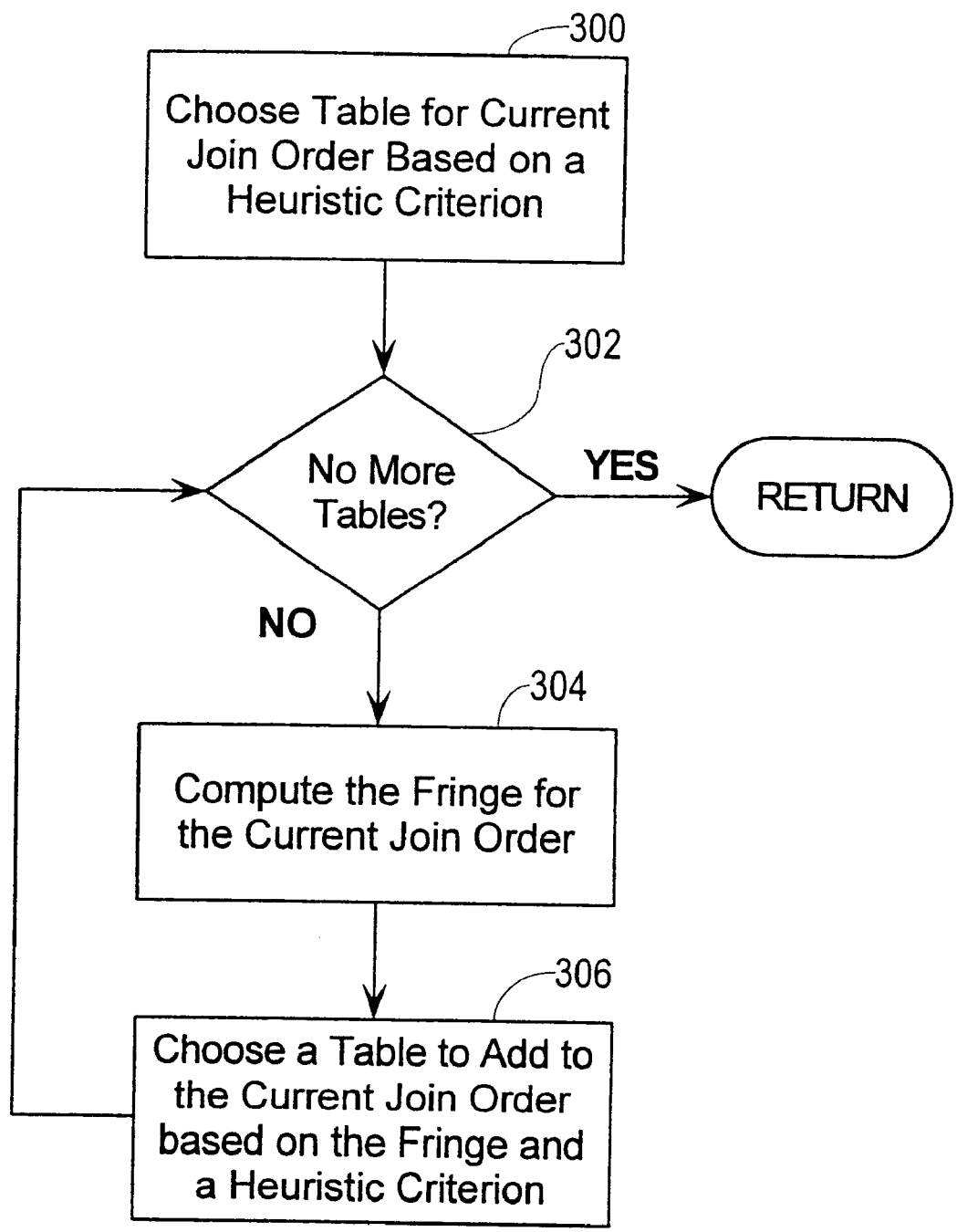
FIG. 3 is a flowchart illustrating the operation of generating an initial table ordering according to an embodiment.

FIG. 3 illustrates one implementation of determining an initial join order according to a heuristic. More specifically, the method of FIG. 3 orders the tables involved in the join according to a predetermined heuristic criterion, and the resulting join order is used as one of the initial join orders.

At step 300, a table is chosen from the tables specified in the query, for example, in the FROM list, based on a heuristic criterion. There are a number of different heuristic criteria that may be used, for example, derived cardinality, single table selectivity, (pseudo-)randomness, and the use of metadata describing extrinsic information about the tables. The chosen table now constitutes the first table in the current join order.

The derived cardinality of a table is the number of rows that match the conditions in the WHERE clause that relate to that table and only to that table. Thus, join conditions that relate to multiple tables are excluded from this criterion. This heuristic is to pick the table with the smallest derived cardinality based on the supposition that joins are cheaper when the number of rows that are joined is smaller and that the result of the join, which may be used as input for subsequent joins, is also likely to be smaller. In the exemplary database, the join condition C.ZIP=19555 results in a derived cardinality of 1 for the customer table 504 and the join condition S.NAME="Smith" also results in a derived cardinality of 1. Since the order table 502 and the assignment table 506 do not have a single table join condition, their derived cardinalities are equal to their number of rows, or 3.

The single table selectivity heuristic refers to the percentage of rows of a table that match the conditions in the WHERE-clause that relate to that table and only to that table. Thus, join conditions that relate to multiple tables are excluded from this criterion. In order words, the single table selectivity may be calculated as the derived cardinality over the number of rows in the table. This heuristic is to pick the table with the smallest single table selectivity based on the intuition that, if a small number of rows are returned from one table, then it is likely that those rows would only match a small percentage of the rows in any table to which the first table was joined. In this situation, the set of rows that need to be processed in subsequent joins is likely to be small and, therefore, those subsequent joins are likely to be cheap. In the example, customer table 504 with a derived cardinality of 1 and four rows, has a single table selectivity of 25%, and the sales associate table 508 with a derived cardinality of 1 but with three rows has a single table selectivity of 33%. The order table 502 and the assignment table 506 have a single table selectivity of 100%.

In the example, the order table 502 and the sales associate table 508 have the same derived cardinality, 1, which is also the smallest. In one implementation, one of these candidates tables is chosen according to some other criterion, such as another heuristic, at random, or arbitrarily. In another implementation, different initial join orderings are generated with each candidate as the first table when the there are multiple candidates that are almost equally good. This approach helps to ensure that multiple, good initial join orderings are generated, and thereby increase the likelihood that a near globally optimal join order is found and that it is found early. Consequently, the exact number of initial join orders that are generated may depend on the query in this implementation.

Figures 5A, 5B:
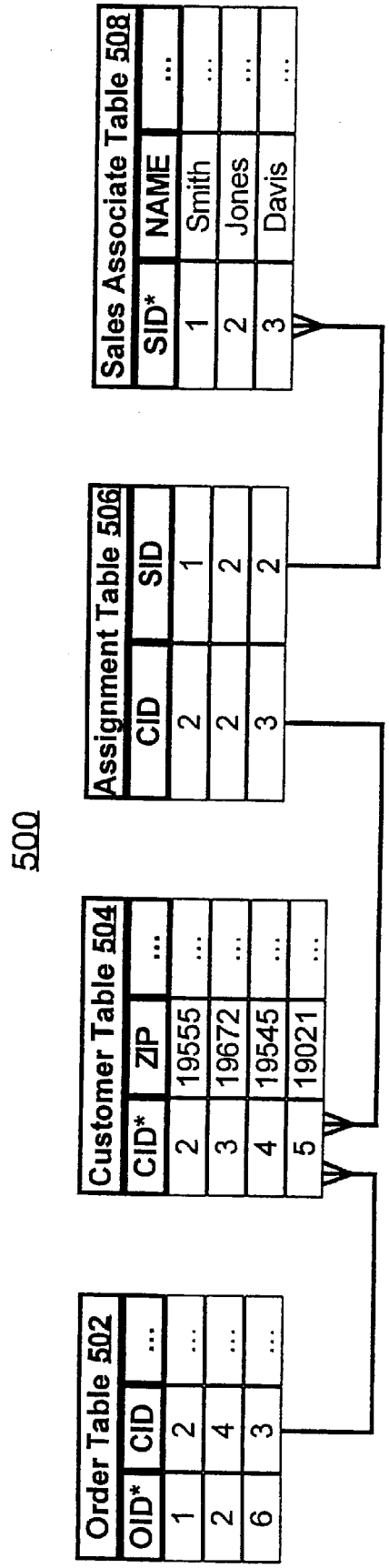
FIG. 5(a) depicts an exemplary database.
FIG. 5(b) depicts exemplary results from query specifying multiple join operations.

Other heuristics can also be employed to choose the first table. For example, the first table can be chosen at random. As another example, metadata can be consulted to exploit extrinsic information about the table. For instance, the double table selectivity of a primary key/foreign key relationship can be adopted. This selectivity is calculated as the selectivity of the primary key table based on the derived cardinality of the foreign key table. In FIG. 5, primary key/foreign key relationships are indicated by a heavy line connecting two columns, with a "V" on the primary key column.

Referring back to FIG. 3, step 302 controls a loop that iterates until all the tables have been added to the current join order. Specifically, the condition in step 302 checks if there are any more tables left to add. If there are more tables, then execution proceeds to step 306. If, on the other hand, there are no more tables, then the entire initial join order has been calculated and execution returns back to FIG. 2, where a search will performed in steps 206 or 210.

At step 304, the "fringe" is computed for the current join order. The fringe consists of those tables that are joined to some table in the current join order by some join condition in the WHERE clause of the query. For example, if the current join order is composed only of customer table 504, then the fringe consists of the order table 502 and the assignment table 506, but not the sales associate table 508.

At step 306, another table is chosen for the current join order based on a heuristic criterion, giving preference to the fringe. Thus, tables not in the fringe are only selected if the fringe is empty, thereby avoiding Cartesian products as long as possible. The heuristic criterion used in step 306 can include derived cardinality, single table selectivity, (pseudo-)randomness, and metadata, and may be the same or different heuristic criterion used in step 300.

When all tables have been added to the current join order, to create the initial join ordering, the loop condition in step 302 breaks the loop and execution returns back to FIG. 2 where a search will performed in steps 206 or 210.

COST-BASED CUT-OFF SEARCH

Figure 4:
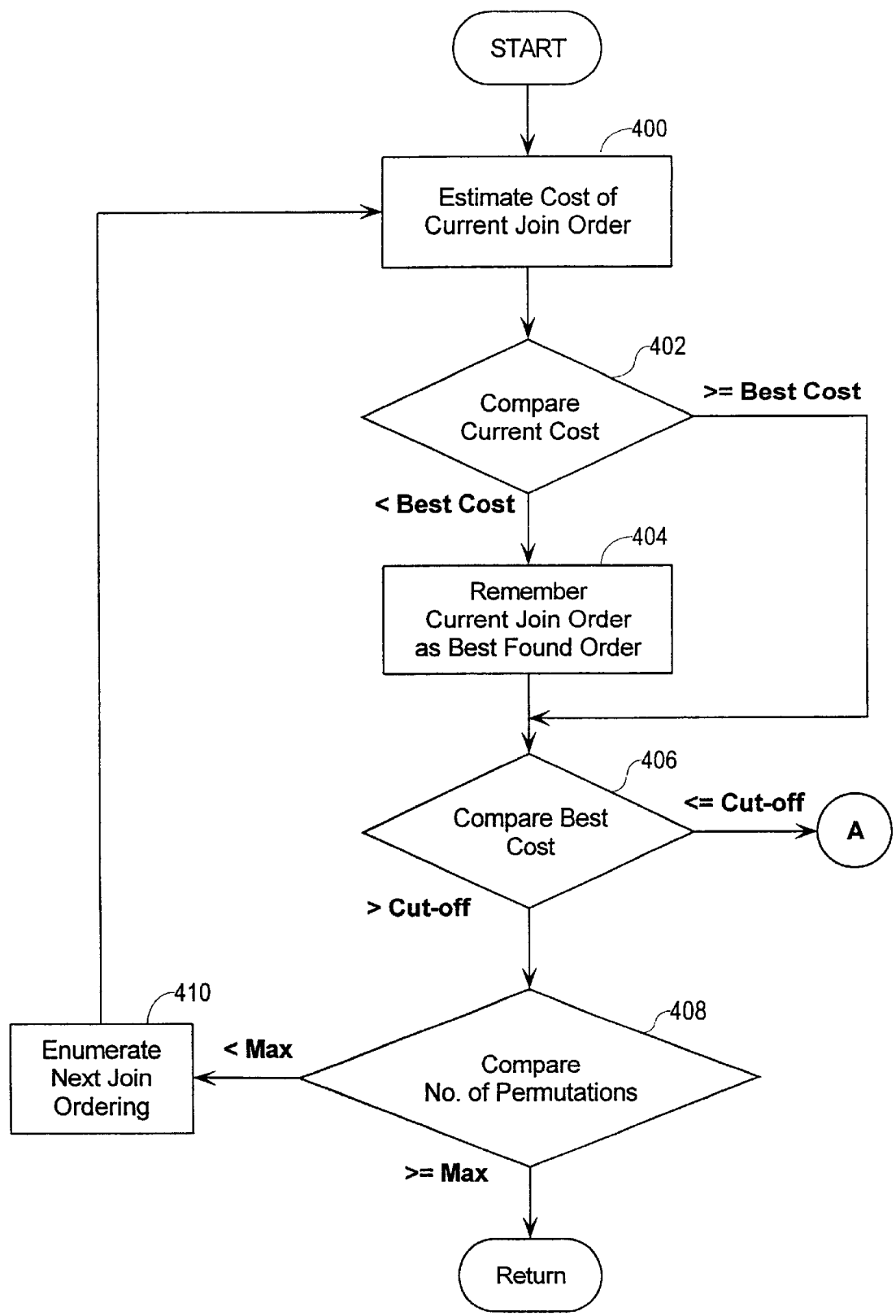
FIG. 4 is a flowchart illustrating the operation of performing a cut-off search according to an embodiment.

Referring to FIG. 4, depicted is a flowchart illustrating the operation of a cost-based, cut-off search that can be used to implements steps 206 and 210 of FIG. 2. At the initial iteration, the initial join ordering is established as the current join order for the search.

At step 400, the cost of executing a query with the current join order is estimated. Various cost metrics may be employed in estimating this cost, but the present invention is not limited to any particular cost metrics. A preferred cost metric, however, estimates the number of input/output blocks of secondary storage (e.g. storage device 110) that are read and written in executing the query. This cost metric also takes into account whether an index can be accessed to perform point lookups and range lookups in the tables.

At step 402, the current cost, estimated in step 400, is compared against the current best cost so far discovered. If the current cost is not less than the best cost, then execution branches to step 406, skipping step 404. If, on the other hand, the current cost is less than the best cost, then a new best join has been found and execution proceeds to step 404. At step 404, the current join order, which has the best cost so far, is remembered as the best found join order.

Step 406 performs the cut-off functionality of the search. Specifically, the best cost is compared with an estimated cut-off cost. The cut-off cost represents the amount of effort that has gone into optimizing the query so far. For example, it can be a function of the number of permutations that have been generated so far multiplied by some adjustment factor that will generate a cost estimate that a plan will have to meet in order to be considered good enough to cut off the search at that point. If the current best cost is less than or equal to the cut-off cost, then execution of all the search terminates and is transferred to step 212 of FIG. 2 via connector A, where the best found join order is established as the desired join order for executing the query in step 214.

If, on the other hand, the current best cost exceeds the cut-off cost, more searching may be profitable. Accordingly, execution continues to step 408, where the number of permutations for this initial ordering is compared. If the number of permutations for this initial ordering reaches the predetermined maximum number of permutations per initial join ordering, then the loop terminates and executions returns to steps 208 or 212 of FIG. 2, for the next initial join ordering, if any.

If, on the other hand, the number of permutations for this initial ordering has not reached the predetermined maximum number of permutations per initial join ordering, then execution continues to step 410, where the next join is enumerated and established as the current join order for step 400. In some embodiments, pruning is implemented to eliminate join orders that are guaranteed to be immediately more costly than the current best cost. For example, with a depth-first search enumeration function, the cost of performing the first join operation in the generated join order is more than the current best cost; thus, all join orders with that join operation first can be safely disregarded.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of determining a desired ordering of join operations on database objects specified by a query to process said query, comprising the computer implemented steps of:

generating a first initial join ordering of the database objects;

enumerating a plurality of first join orderings based on the first initial join ordering;

searching the plurality of first join orderings for the desired ordering based on cost estimation;

generating a second initial join ordering of the database objects;

enumerating a plurality of second join orderings based on the second initial join ordering;

searching the plurality of second join orderings for the desired ordering based on cost estimation;

wherein said searching the plurality of first join orderings includes:

comparing a best cost of a currently least cost join order and an estimated cost expended in said searching the plurality of first join orderings; and if the best cost of the currently least cost join order is greater than the estimated cost expended in said searching plurality of first join orderings, then terminating said searching the plurality of the first join orderings.

2. The method of claim 1, wherein the step of generating the first initial join ordering based on a first heuristic includes the step of choosing a database object from among a plurality of database objects specified by the query based on a derived cardinality of the database object.

3. The method of claim 1, wherein the step of generating the first initial join ordering based on a first heuristic includes the step of choosing a database object from among a plurality of database objects specified by the query based on a single database object selectivity of the database object.

4. The method of claim 1, wherein the step of generating the first initial join ordering based on a first heuristic includes the step of randomly choosing a database object from among a plurality of database objects specified by the query.

5. The method of claim 1, wherein the step of generating the first initial join ordering based on a first heuristic includes the step of choosing a database object from among a plurality of database objects specified by the query based on metadata describing the database object.

6. The method of claim 1, wherein the step of generating the first initial join ordering based on a first heuristic includes the step of choosing a database object from among a plurality of database objects specified by the query based on a primary key relationship with another database object.

7. The method of claim 1, wherein the step of generating the first initial join ordering based on a first heuristic includes the steps of:

establishing a first database object to be part of a current join order based on the first heuristic;

determining a fringe for the current join order, wherein the fringe consists of database objects, specified in the query, that are joined to a database object in the current join order; and if the fringe is non-empty, then establishing a database object from the fringe to be part of the current join order.

8. The method of claim 1, wherein the step of searching the plurality of first join orderings for the desired ordering based on cost estimation includes the steps of:

estimating a cost of a current join order;

comparing the cost of the current join order and a best cost of a currently least cost join order;

if the cost of the current join order is less than the best cost of the currently least cost join order, then establishing the current join order as the currently least cost join order;

comparing a number of the enumerated first join orders with a predetermined number of permutations;

if the number of enumerated first join orders is less than the predetermined number of permutations, then permuting the current join ordering; and establishing the currently least cost join order as the desired join ordering.

9. The method of claim 1, wherein:

the step of generating a first initial join ordering of the database objects includes generating the first initial join ordering based on a first heuristic; and the step of generating a second initial join ordering of the database objects includes generating the second initial join ordering based on a second heuristic different from the first heuristic.

10. A method of processing a query specifying a plurality of join operations on one or more database objects, comprising the computer-implemented steps of:

parsing the query to determine the join operations;

determining a desired join order of the join operations including the steps of:

generating a first initial join ordering of the join operations based on a first heuristic by choosing a first database object from among a plurality of database objects specified by the query based on any of a derived cardinality of the first database object, a single database object selectivity of the first database object, metadata describing the first database object, and a primary key relationship with another database object;

enumerating a plurality of first join orderings based on the first initial join ordering to search for the desired ordering based on cost estimation including the steps of:

establishing the first initial join ordering as a current join ordering;

estimating a cost of the current join ordering;

comparing the cost of the current join ordering and a best cost of a currently least cost join ordering;

if the cost of the current join ordering is less than the best cost of the currently least cost join ordering, then establishing the current join ordering as the currently least cost join ordering;

comparing a number of the enumerated first join orderings with a predetermined number of permutations; and if the number of enumerated first join orders is less than the predetermined number of permutations, then permuting the current join ordering;

generating a second initial join ordering of the join operations based on a second heuristic other than the first heuristic by choosing a second database object from among a plurality of database objects specified by the query based on any of a derived cardinality of the second database object, a single database object selectivity of the second database object, metadata describing the second database object, and a primary key relationship with another second database object; and enumerating a plurality of second join orderings based on the second initial join ordering to search for the desired ordering based on cost estimation including the steps of:

establishing the second initial join ordering as the current join ordering;

estimating the cost of the current join ordering;

comparing the cost of the current join ordering and the best cost of the currently least cost join ordering;

if the cost of the current join ordering is less than the best cost of the currently least cost join ordering, then establishing the current join ordering as the currently least cost join ordering;

comparing a number of the enumerated second join orderings with the predetermined number of permutations; and if the number of enumerated second join orders is less than the predetermined number of permutations, then permuting the current join ordering;

comparing the best cost of the currently least cost join ordering and an estimated cost expended in searching the number of enumerated join orders;

if the best cost of the currently least cost join ordering is greater than the estimated cost expended in said searching the number of enumerated join orders, then terminating the enumeration of the first or second join orderings; and establishing the currently least cost join ordering as the desired join ordering; and executing the query based on the desired join order.

11. A computer-readable medium bearing instructions arranged to cause one or more processors to perform the steps of the method according to claim 10.

12. A computer-readable medium bearing instructions for determining a desired ordering of join operations on database objects specified by a query to process said query, said instructions arranged, when executed by one or more processors, to cause the one or more processors to perform the steps of:

generating a first initial join ordering of the database objects based on a first heuristic;

enumerating a plurality of first join orderings based on the first initial join ordering to search for the desired ordering based on cost estimation;

generating a second initial join ordering of the database objects based on a second heuristic, different from the first heuristic; and enumerating a plurality of second join orderings based on the second initial join ordering to search for the desired ordering based on cost estimation;

wherein said enumerating the plurality of first join orderings includes:

comparing a best cost of a currently least cost join order and an estimated cost expended in said enumerating the plurality of first join orderings; and if the best cost of the currently least cost join order is greater than the estimated cost expended in said enumerating plurality of first join orderings, then terminating said enumerating the plurality of the first join orderings.

* * * * *

UNITED STATES PATENT AND TRADEMARK OFFICE
CERTIFICATE OF CORRECTION

PATENT NO. : 6,377,943 B1
DATED : April 23, 2002
INVENTOR(S) : Håkan Jakobsson

It is certified that error appears in the above-identified patent and that said Letters Patent is hereby corrected as shown below:

Column 11,
Line 17, change "an estimated cost expended" to -- an estimated cut-off cost expeded --;
Lines 19-20, change "if the best cost of the currently least cost join order is greater than the estimated cost" to -- if the best cost of the currently least cost join order is less than or equal to the estimated cut-off cost --;
Lines 22-23, change "first join orderings." to -- first join orderings; and --.
Between lines 23 and 24, at the end of claim 1, add -- establishing the currently least cost join order as the desired ordering of join operations. -- with the same amount of indentation as column 11, line 19 of claim 1.

Column 13,
Line 17, change "an estimated cost" to -- an estimated cut-off cost --;
Lines 19-20, change "if the best cost of the currently least cost join order is greater than the estimated cost" to -- if the best cost of the currently least cost join order is less than or equal to the estimated cut-off cost --.

Column 14,
Line 22, change "an estimated cost expended" to -- an estimated cut-off cost expeded --;
Lines 24-25, change "if the best cost of the currently least join order is greater than the estimated cost" to -- if the best cost of the currently least cost join order is less than or equal to the estimated cut-off cost --;
Lines 27-28, change "first join orderings." to -- first join orderings; and --.

UNITED STATES PATENT AND TRADEMARK OFFICE
CERTIFICATE OF CORRECTION

PATENT NO. : 6,377,943 B1
DATED : April 23, 2002
INVENTOR(S) : Håkan Jakobsson

It is certified that error appears in the above-identified patent and that said Letters Patent is hereby corrected as shown below:

Column 14, cont'd.,
Line 28, at the end of claim 12, add -- establishing the currently least cost join order as the desired ordering of join operations. -- with the same amount of indentation as column 11, line 19 of claim 1.

Signed and Sealed this

Tenth Day of August, 2004

JON W. DUDAS
*Acting Director of the United States Patent and Trademark Office*